US012626464B2

(12) United States Patent
Kim et al.

(10) Patent No.: US 12,626,464 B2
(45) Date of Patent: May 12, 2026

(54) PROGRESSIVELY GENERATING FINE POLYGON MESHES

(71) Applicant: Adobe Inc., San Jose, CA (US)

(72) Inventors: Vladimir Kim, Seattle, WA (US); Yun-Chun Chen, Toronto (CA); Noam Aigerman, San Francisco, CA (US); Alec Jacobson, Toronto (CA)

(73) Assignee: Adobe Inc., San Jose, CA (US)

( * ) Notice: Subject to any disclaimer, the term of this patent is extended or adjusted under 35 U.S.C. 154(b) by 209 days.

(21) Appl. No.: 18/355,995

(22) Filed: Jul. 20, 2023

(65) Prior Publication Data

US 2025/0029335 A1 Jan. 23, 2025

(51) Int. Cl.
*G06T 17/20* (2006.01)

(52) U.S. Cl.
CPC ........ *G06T 17/205* (2013.01); *G06T 2210/36* (2013.01)

(58) Field of Classification Search
CPC .... G06T 17/205; G06T 2210/36; G06T 17/20
See application file for complete search history.

(56) References Cited

U.S. PATENT DOCUMENTS

| | | | | |
|---|---|---|---|---|
| 6,208,347 B1 * | 3/2001 | Migdal | ................... | G06T 15/00 |
| | | | | 345/419 |
| 2013/0300741 A1 * | 11/2013 | Schmidt | ................... | G06T 17/20 |
| | | | | 345/420 |

| | | | | |
|---|---|---|---|---|
| 2014/0160122 A1 * | 6/2014 | Chou | ...................... | G06T 13/40 |
| | | | | 345/420 |
| 2020/0302623 A1 * | 9/2020 | Yan | .......................... | G06T 11/00 |
| 2021/0090242 A1 * | 3/2021 | Hever | ...................... | G06T 17/20 |
| 2022/0301348 A1 * | 9/2022 | Bradley | ................. | G06T 17/20 |
| 2023/0237840 A1 * | 7/2023 | Orvalho | .............. | G06V 40/166 |
| | | | | 382/118 |

OTHER PUBLICATIONS

Alliez, Pierre , et al., "Valence-Driven Connectivity Encoding for 3D Meshes", Eurographics 2001 Conference Proceedings [retrieved Mar. 16, 2023]. Retrieved from the Internet <http://www.geometry.caltech.edu/pubs/AD_EG01.pdf>., Jul. 25, 2002, 10 Pages.

(Continued)

*Primary Examiner* — Xiao M Wu
*Assistant Examiner* — Latrell Anthony Creary
(74) *Attorney, Agent, or Firm* — FIG. 1 Patents

(57) ABSTRACT

In implementation of techniques for progressively generating fine polygon meshes, a computing device implements a mesh progression system to receive a coarse polygon mesh. The mesh progression system generates a fine polygon mesh that has a higher level of resolution than the coarse polygon mesh by decoding the coarse polygon mesh using a machine learning model. The mesh progression system then receives additional data describing a residual feature of a polygon mesh. Based on the additional data, the mesh progression system generates an adjusted fine polygon mesh that has a higher level of resolution than the fine polygon mesh.

20 Claims, 8 Drawing Sheets

(56) References Cited

OTHER PUBLICATIONS

Baldi, Pierre , "Autoencoders, unsupervised learning and deep architectures", International Conference on Unsupervised and Transfer Learning workshop, vol. 27 [retrieved Mar. 16, 2023]. Retrieved from the Internet <https://web.archive.org/web/20220401092727id_/http://proceedings.mlr.press/v27/baldi12a/baldi12a.pdf>., Jul. 2, 2011, 14 Pages.

Bengio, Yoshua , et al., "Learning Deep Architectures for AI", Foundations and TrendsR in Machine Learning vol. 2, No. 1 [retrieved Mar. 16, 2023]. Retrieved from the Internet <https://vsokolov.org/courses/750/2018/files/bengiofull2009.pdf>., Nov. 15, 2009, 130 Pages.

Bojanowski, Piotr , et al., "Optimizing the Latent Space of Generative Networks", Cornell University arXiv, arXiv.org [retrieved Mar. 16, 2023]. Retrieved from the Internet <https://arxiv.org/pdf/1707.05776.pdf>., May 20, 2019, 10 Pages.

Catmull, E , et al., "Recursively generated B-spline surfaces on arbitrary topological meshes", Seminal graphics: pioneering efforts that shaped the field [retrieved Mar. 16, 2023]. Retrieved from the Internet <http://hakenberg.de/subdivision/general/recursively_generated_b-spline_surfaces_on_arbitrary_generated_meshes.pdf>., Jul. 1, 1998, 6 Pages.

Chen, Zhiqin , et al., "Learning Implicit Fields for Generative Shape Modeling", Cornell University arXiv, arXiv.org [retrieved Mar. 16, 2023]. Retrieved from the Internet <https://arxiv.org/pdf/1812.02822.pdf>., Sep. 16, 2019, 10 Pages.

Deering, Michael , "Geometry Compression", ACM SIGGRAPH 98 Conference Proceedings [retrieved Mar. 16, 2023]. Retrieved from the Internet <https://dl.acm.org/doi/pdf/10.1145/218380.218391>., Aug. 1995, 8 Pages.

Garland, Michael , et al., "Surface Simplification Using Quadric Error Metrics", Computer graphics and interactive techniques [retrieved Mar. 16, 2023]. Retrieved from the Internet <https://dl.acm.org/doi/pdf/10.1145/258734.258849>., 1997, 8 pages.

Groueix, Thibault , et al., "3D-CODED: 3D Correspondences by Deep Deformation", Cornell University arXiv, arXiv.org [retrieved Mar. 16, 2023]. Retrieved from the Internet <https://arxiv.org/pdf/1806.05228.pdf>., Jul. 27, 2018, 23 Pages.

Groueix, Thibault , et al., "A papier-mâché approach to learning 3d surface generation", IEEE Conference on Computer Vision and Pattern Recognition [retrieved Mar. 16, 2023]. Retrieved from the Internet <https://openaccess.thecvf.com/content_cvpr_2018/papers/Groueix_A_Papier-Mache_Approach_CVPR_2018_paper.pdf>., Jun. 2018, 9 Pages.

Hanocka, Rana , et al., "MeshCNN: A Network with an Edge", Cornell University arXiv, arXiv.org [retrieved Mar. 16, 2023]. Retrieved from the Internet <https://arxiv.org/pdf/1809.05910.pdf>., Feb. 13, 2019, 12 Pages.

Hertz, Amir , et al., "Deep Geometric Texture Synthesis", Cornell University arXiv, arXiv.org [retrieved Mar. 16, 2023]. Retrieved from the Internet <https://arxiv.org/pdf/2007.00074.pdf>., Jun. 30, 2020, 11 Pages.

Hoppe, Hugues , "Piecewise Smooth Surface Reconstruction", Proceedings of the 21st annual conference on Computer graphics and interactive techniques [retrieved 2023 Mar. 16, 2023]. Retrieved from the Internet <https://sites.stat.washington.edu/people/wxs/Siggraph-94/siggraph94.pdf>., 1994, 8 pages.

Hoppe, Hugues , "Progressive Meshes", ACM SIGGRAPH [retrieved Mar. 16, 2023]. Retrieved from the Internet <https://dl.acm.org/doi/pdf/10.1145/237170.237216>., 1996, 10 pages.

Hu, Shi-Min , et al., "Subdivision-Based Mesh Convolution Networks", Cornell University arXiv, arXiv.org [retrieved Mar. 16, 2023]. Retrieved from the Internet <https://arxiv.org/pdf/2106.02285.pdf>., Dec. 29, 2021, 16 Pages.

Hu, Yixin , et al., "Tetrahedral meshing in the wild", ACM Transactions on Graphics, vol. 37, No. 4 [retrieved Mar. 16, 2023]. Retrieved from the Internet <https://www.cs.toronto.edu/~jacobson/images/tetrahedral-meshing-in-the-wild-siggraph-2018-compressed-hu-et-al.pdf>., Jul. 30, 2018, 14 Pages.

Ioffe, Sergey , et al., "Batch Normalization: Accelerating Deep Network Training by Reducing Internal Covariate Shift", Proceedings of the 32nd International Conference on Machine Learning, PMLR [retrieved Mar. 16, 2023]. Retrieved from the Internet <http://proceedings.mlr.press/v37/ioffe15.pdf>., Mar. 2015, 11 pages.

Kingma, Diederik P, et al., "Adam: A Method for Stochastic Optimization", Cornell University, arXiv Preprint, arXiv.org [retrieved Aug. 9, 2023]. Retrieved from the Internet <https://arxiv.org/pdf/1412.6980.pdf>., Jan. 30, 2017, 15 pages.

Lescoat, Thibault , et al., "Spectral mesh simplification", Computer Graphics Forum, Eurographics vol. 39, No. 2 [retrieved Mar. 16, 2023]. Retrieved from the Internet <https://diglib.eg.org/handle/10.1111/cgf13932>., 2020, 10 Pages.

Loop, Charles Teorell, "Smooth Subdivision Surfaces Based on Triangles", Master of Science Thesis, Department of Mathematics, University of Utah [retrieved Mar. 16, 2023]. Retrieved from the Internet <https://www.microsoft.com/en-us/research/wp-content/uploads/2016/02/thesis-10.pdf>., Aug. 1987, 74 Pages.

Martel, Julien , et al., "ACORN: Adaptive Coordinate Networks for Neural Scene Representation", Cornell University arXiv, arXiv.org [retrieved Mar. 16, 2023]. Retrieved from the Internet <https://arxiv.org/pdf/2105.02788.pdf>., May 6, 2021, 18 Pages.

McCormac, John , et al., "SemanticFusion: Dense 3D Semantic Mapping with Convolutional Neural Networks", Cornell University arXiv, arXiv.org [retrieved Mar. 16, 2023]. Retrieved from the Internet <https://arxiv.org/pdf/1609.05130.pdf>., Sep. 28, 2016, 7 Pages.

Mescheder, Lars , et al., "Occupancy Networks: Learning 3D Reconstruction in Function Space", Conference on Computer Vision and Pattern Recognition [retrieved Mar. 16, 2023]. Retrieved from the Internet <https://www.cs.toronto.edu/~bonner/courses/2022s/csc2547/papers/3D_structure/implicit_functions/occupancy_networks,_mescheder,_cvpr2019.pdf>., Apr. 30, 2019, 11 Pages.

Mitchel, Thomas , et al., "Field Convolutions for Surface CNNs", Cornell University arXiv, arXiv.org [retrieved Mar. 16, 2023]. Retrieved from the Internet <https://arxiv.org/pdf/2104.03916.pdf>., Apr. 8, 2021, 13 Pages.

Morreale, Luca , et al., "Neural Convolutional Surfaces", Cornell University arXiv, arXiv.org [retrieved Mar. 16, 2023]. Retrieved from the Internet <https://arxiv.org/pdf/2204.02289.pdf>., Apr. 5, 2022, 12 Pages.

Nair, Vinod , et al., "Rectified Linear Units Improve Restricted Boltzmann Machines", In Proceedings of the 27th International Conference on Machine Learning (ICML-10) [retrieved Mar. 16, 2023]. Retrieved from the Internet <http:// www.csri.utoronto.ca/~hinton/absps/reluICML.pdf>., Jun. 21, 2010, 8 pages.

Park, Jeong Joon , et al., "DeepSDF: Learning Continuous Signed Distance Functions for Shape Representation", Cornell University arXiv, arXiv.org [retrieved Mar. 16, 2023]. Retrieved from the Internet <https://arxiv.org/pdf/1901.05103.pdf>., Jan. 16, 2019, 19 Pages.

Paszke, Adam , et al., "PyTorch: An Imperative Style, High-Performance Deep Learning Library", Cornell University arXiv, arXiv.org [retrieved Aug. 9, 2023]. Retrieved from the Internet <https://arxiv.org/pdf/1912.01703.pdf>., Dec. 3, 2019, 12 Pages.

Potamias, Rolandos Alexandros , et al., "Neural Mesh Simplification", IEEE/CVF Conference on Computer Vision and Pattern Recognition [retrieved Mar. 16, 2023]. Retrieved from the Internet <https://openaccess.thecvf.com/content/CVPR2022/papers/Potamias_Neural_Mesh_Simplification_CVPR_2022_paper.pdf>., Jun. 2022, 10 Pages.

Qi, Charles R, et al., "PointNet: Deep Learning on Point Sets for 3D Classification and Segmentation", Cornell University arXiv, arXiv.org [retrieved Mar. 15, 2023]. Retrieved from the Internet <https://arxiv.org/pdf/1612.00593.pdf>., Apr. 10, 2017, 19 pages.

Qi, Charles R, "PointNet++: Deep Hierarchical Feature Learning on Point Sets in a Metric Space", Comell University arXiv, arXiv.org [retrieved Mar. 16, 2023]. Retrieved from the Internet <https://arxiv.org/pdf/1706.02413.pdf>., Jun. 2017, 10 pages.

Ronneberger, Olaf , et al., "U-Net: Convolutional Networks for Biomedical Image Segmentation", Cornell University arXiv, arXiv.

(56)        References Cited

OTHER PUBLICATIONS org [retrieved Mar. 16, 2023]. Retrieved from the Internet <https://arxiv.org/pdf/1505.04597.pdf>., May 18, 2015, 8 pages.

Rossignac, Jarek , "Edgebreaker: Connectivity Compression for Triangle Meshes", IEEE Transactions on Visualization and Computer Graphics [retrieved Mar. 16, 2023]. Retrieved from the Internet <https://web.archive.org/web/20170706053054id_/https://people.eecs.berkeley.edu/~jrs/meshpapers/Rossignac.pdf>., 1999, 16 Pages.

Su, Hang , et al., "Multi-View Convolutional Neural Networks for 3D Shape Recognition", Cornell University arXiv, arXiv.org [retrieved Mar. 16, 2023]. Retrieved from the Internet <https://arxiv.org/pdf/1505.00880.pdf>., Sep. 27, 2015, 12 Pages.

Surazhsky, Vitaly , et al., "Explicit surface remeshing", SGP '03: Proceedings of the 2003 Eurographics/ACM SIGGRAPH symposium on Geometry processing [retrieved Mar. 16, 2023]. Retrieved from the Internet <https://diglib.eg.org/bitstream/handle/10.2312/SGP.SGP03.020-030/020-030.pdf?sequence=1&isAllowed=y>., Jun. 23, 2003, 11 Pages.

Szymczak, Andrzej , et al., "An Edgebreaker-Based Efficient Compression Scheme for Regular Meshes", 12th Canadian Conference on Computational Geometry [retrieved Mar. 16, 2023]. Retrieved from the Internet <https://www.sciencedirect.com/science/article/pii/S0925772101000359>., 2000, 9 Pages.

Szymczak, Andrzej , et al., "Piecewise Regular Meshes: Construction and Compression", Graphical Models, vol. 64, No. 3-4 [retrieved Mar. 16, 2023]. Retrieved from the Internet <https://citeseerx.ist.psu.edu/document?repid=rep1&type=pdf&doi=229fd8391a64521064bc3db7476b9fae0ad869ec>., May 1, 2002, 15 Pages.

Takikawa, Towaki , et al., "Neural Geometric Level of Detail: Real-time Rendering with Implicit 3D Shapes", Cornell University arXiv, arXiv.org [retrieved Mar. 16, 2023]. Retrieved from the Internet <https://arxiv.org/pdf/2101.10994.pdf>., Jan. 26, 2021, 16 Pages.

Taubin, Gabriel , et al., "Geometric Compression Through Topological Surgery", ACM Transactions on Graphics 17(2) [retrieved Mar. 16, 2023]. Retrieved from the Internet <https://web.archive.org/web/20170812011943id_/https://www.cc.gatech.edu/~jarek/papers/TopologicalSurgery.pdf>., Apr. 1998, 32 Pages.

Touma, Costa , et al., "Triangle Mesh Compression", Graphics Interface 98 Conference Proceedings [retrieved Mar. 16, 2023]. Retrieved from the Internet <https://researchwith.njit.edu/en/publications/triangle-mesh-compression>., Jun. 1998, 9 Pages.

Tran, Du , et al., "Learning Spatiotemporal Features with 3D Convolutional Networks", Cornell University arXiv, arXiv.org [retrieved Mar. 16, 2023]. Retrieved from the Internet <https://arxiv.org/pdf/1412.0767.pdf>., Oct. 7, 2015, 16 Pages.

Zhou, Qingnan , "Thingi10k: A dataset of 10,000 3d-printing models", Cornell University arXiv, arXiv.org [retrieved Mar. 16, 2023]. Retrieved from the Internet <https://arxiv.org/pdf/1605.04797.pdf>., Jul. 2, 2016, 8 Pages.

Zorin, Denis , et al., "Interpolating Subdivision for Meshes of Arbitary Topology", Interpolating Subdivision for Meshes of Arbitary Topology [retrieved Mar. 16, 2023]. Retrieved from the Internet <https://web.archive.org/web/20170809002925id_/http://mrl.nyu.edu/publications/interpolating-subdivision/butterfly.pdf>., 1996, 4 Pages.

* cited by examiner

200

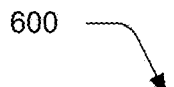

600

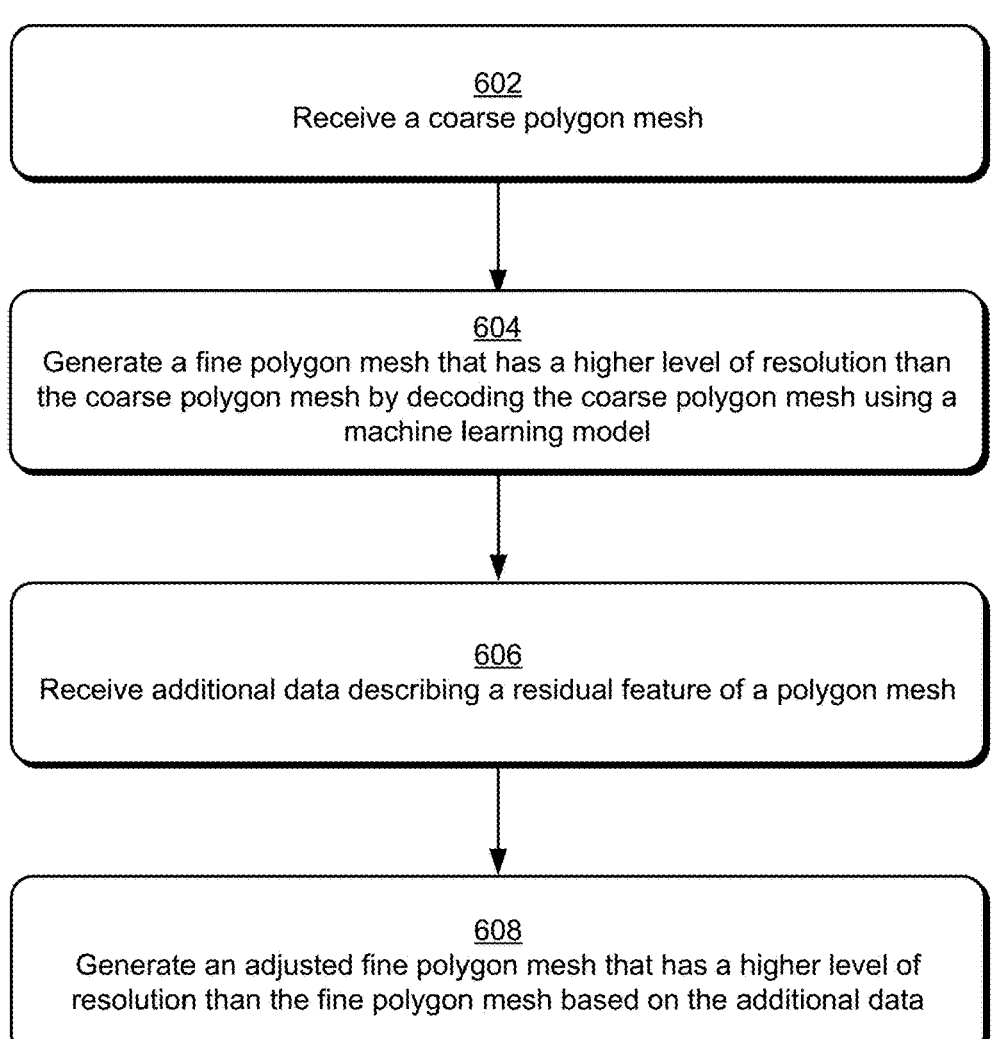

602
Receive a coarse polygon mesh

604
Generate a fine polygon mesh that has a higher level of resolution than the coarse polygon mesh by decoding the coarse polygon mesh using a machine learning model 606
Receive additional data describing a residual feature of a polygon mesh 608
Generate an adjusted fine polygon mesh that has a higher level of resolution than the fine polygon mesh based on the additional data

Fig. 6

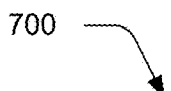

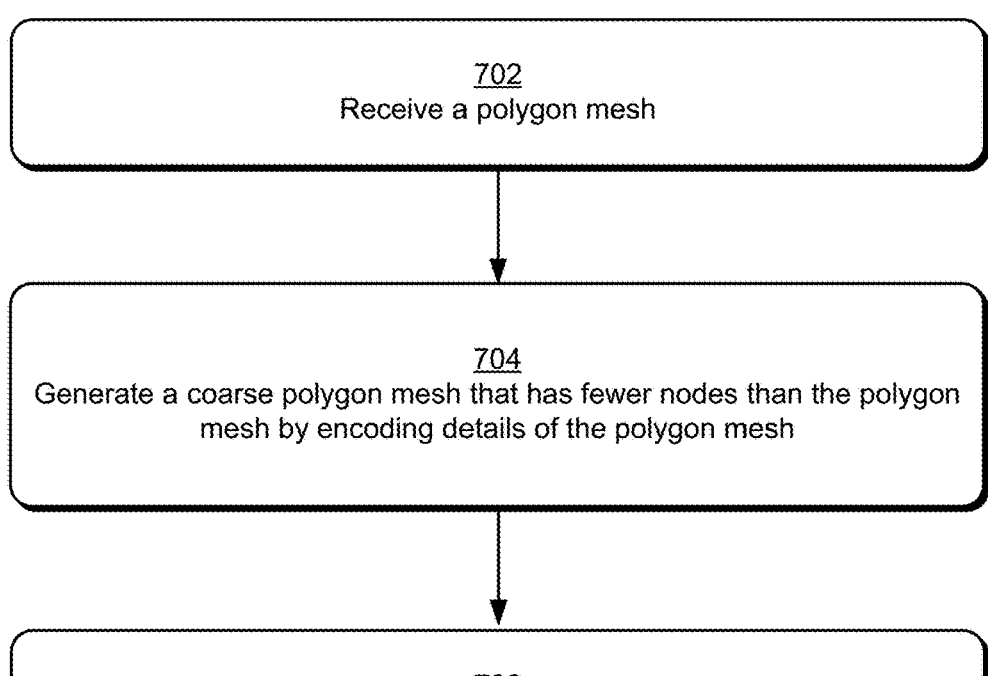

702
Receive a polygon mesh

704
Generate a coarse polygon mesh that has fewer nodes than the polygon mesh by encoding details of the polygon mesh 706
Transmit the coarse polygon mesh to a client device, the coarse polygon mesh configured to cause the client device to generate a fine polygon mesh that has more nodes than the coarse polygon mesh by decoding the coarse polygon mesh using a machine learning model

PROGRESSIVELY GENERATING FINE POLYGON MESHES

BACKGROUND

In computer graphics, a three-dimensional (3D) mesh is a collection of nodes, edges, and faces that define a geometry of a three-dimensional object. The 3D mesh is a visual component used to represent and render 3D objects in various applications, including video games, virtual reality, computer-aided design (CAD), and animation. By combining nodes, edges, and faces, the 3D mesh represents complex shapes and objects. For example, connections between the nodes and the arrangement of faces define a topology and an overall structure of the 3D mesh. However, in conventional techniques a significant amount of data is used to render 3D meshes, which causes errors and results in visual inaccuracies, computational inefficiencies, and increased power consumption in real world scenarios.

SUMMARY

Techniques and systems for progressively generating fine polygon meshes are described. In an example, a mesh progression system receives a polygon mesh. Based on the polygon mesh, the mesh progression system generates a coarse polygon mesh that has fewer nodes than the polygon mesh by encoding details of the polygon mesh. The mesh progression system then transmits the coarse polygon mesh to a client device.

The mesh progression system generates a fine polygon mesh that has a higher level of resolution than the coarse polygon mesh by decoding the coarse polygon mesh using a machine learning model. For example, generating the fine polygon mesh includes subdividing polygons of the coarse polygon mesh into multiple polygons. In some examples, the machine learning model is trained using a dataset including the polygon mesh used to generate the coarse polygon mesh.

Additional data describing a residual feature of the polygon mesh is received by the mesh progression system, the additional data transmitted to the client device separately from the coarse polygon mesh. For example, the additional data specifies vertex coordinates of polygons for the residual feature of the polygon mesh. Based on the additional data, the mesh progression system generates an adjusted fine polygon mesh that has a higher level of resolution than the fine polygon mesh. The adjusted fine polygon mesh is output for display in a user interface. In some examples, the fine polygon mesh is displayed in the user interface while the adjusted fine polygon mesh is generated.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 6 depicts a procedure in an example implementation of progressively generating fine polygon meshes.

FIG. 7 depicts a procedure in an additional example implementation of progressively generating fine polygon meshes.

DETAILED DESCRIPTION

Overview

Figure 1:
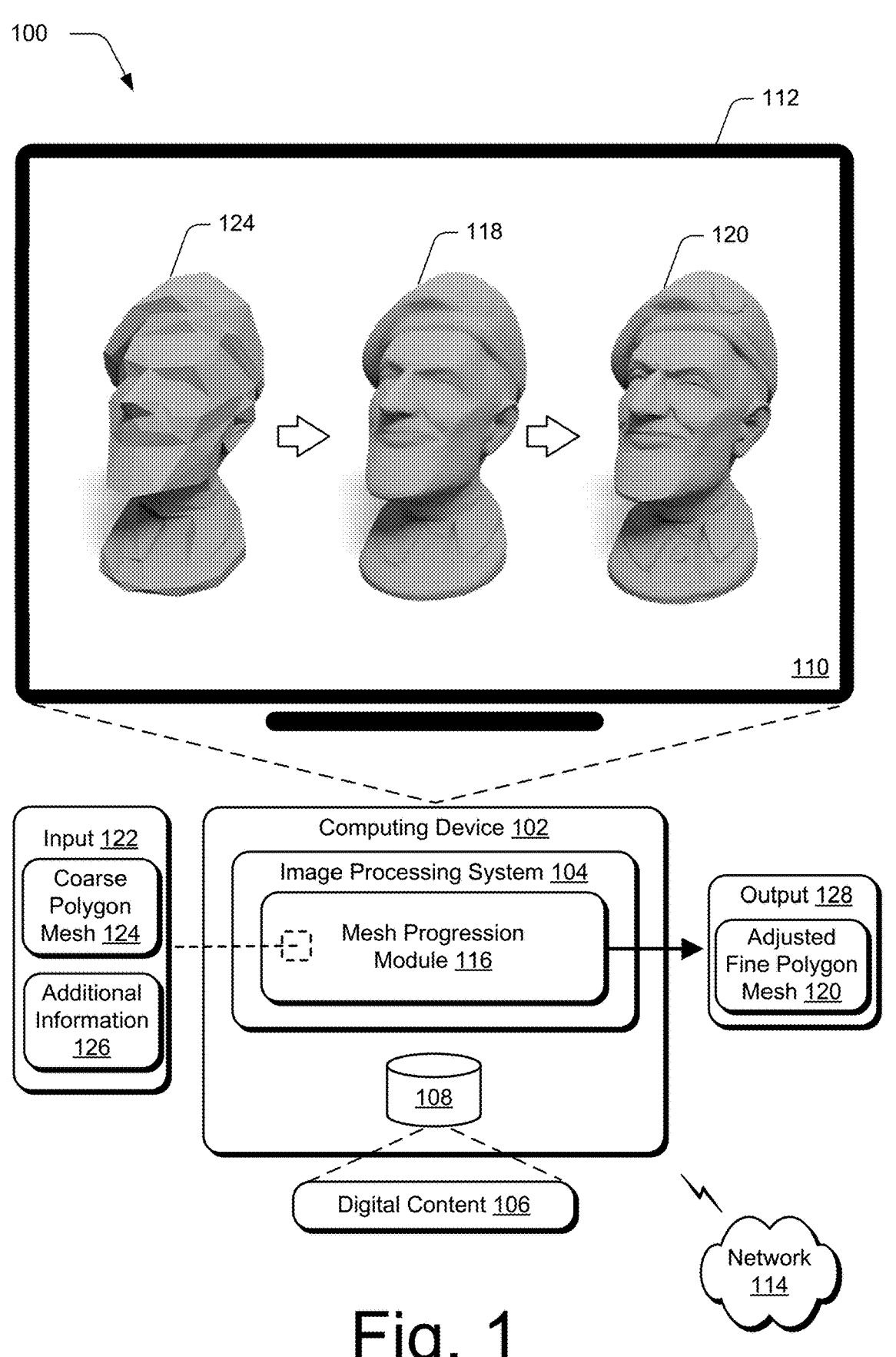
FIG. 1 is an illustration of a digital medium environment in an example implementation that is operable to employ techniques and systems for progressively generating fine polygon meshes as described herein.

A polygon mesh is a representation of a three-dimensional (3D) object in computer graphics. A polygon mesh is formed by nodes, edges, and faces that define a shape and a structure of the 3D object. Nodes, or vertices, are individual points in 3D space that define positions of the 3D object's corners, edges, and surface points. A node has three coordinates (x, y, z) to represent its position 3D on a cartesian plane. Edges are line segments connecting pairs of nodes. The edges represent boundaries and contours of the 3D object and define the overall shape and structure of the 3D object. Faces are polygons, including triangles or quadrilaterals, formed by connecting three or more vertices with edges. The faces define visible surfaces of the 3D object.

Polygon meshes vary in complexity, from simple geometric shapes to highly detailed models. For example, a polygon mesh with a high level of resolution includes more nodes, edges, and faces than a polygon mesh with a low level of resolution. High resolution polygon meshes are used to represent and render 3D objects in video games, virtual reality, computer-aided design (CAD), animation, and other applications. However, high resolution polygon meshes are rendered in a user interface using a large amount of data and thus face challenges when transmitted to a client device over a network with a restrictive bandwidth budget.

Techniques and systems are described for progressively generating fine polygon meshes that overcome these limitations. A mesh progression system begins in this example by receiving a polygon mesh. For example, the polygon mesh has a high level of resolution and is rendered using a large amount of data. The polygon mesh is intended for transmission over a network to a client device for display in a user interface. However, in some real world scenarios network restrictions limit the amount data transmitted over the network, and thus the data file size for the polygon mesh is too large to transmit in its current form.

To reduce the size of the polygon mesh to comply with the network restrictions, the mesh progression system generates a coarse polygon mesh by encoding the polygon mesh. The coarse polygon mesh includes fewer nodes than the polygon mesh and therefore has a lower level of resolution than the polygon mesh. Because the coarse polygon mesh is rendered using less data than the polygon mesh, the mesh progression system transmits the coarse polygon mesh to the client device in compliance with the network restrictions.

After the coarse polygon mesh is transmitted to the client device, the mesh progression system generates a fine polygon mesh by decoding the coarse polygon mesh using a machine learning model. For example, the mesh progression system generates the fine polygon mesh by subdividing polygons of the coarse polygon mesh into multiple polygons using the machine learning model, which is trained using a dataset including a plurality of different coarse polygon meshes and corresponding fine polygon meshes. This restores at least a portion of detail from the polygon mesh because the fine polygon mesh has more nodes and a higher level of resolution than the coarse polygon mesh.

To further increase the level of detail and the level of resolution of the fine polygon mesh in one or more examples, the mesh progression system generates an adjusted fine polygon mesh, which is at least one iteration of a series of progressive updates. The mesh progression system generates the adjusted fine polygon mesh using additional information that is transmitted separately from the coarse polygon mesh to the client device. The additional information defines residual features of the polygon mesh, which are specific areas of high detail of the polygon mesh. For example, residual features of a polygon mesh depicting a 3D face include eyes, a nose, a mouth, and ears. The additional information, for instance, specifies vertex coordinates of polygons for the residual features of the polygon mesh, which the mesh progression system leverages using the machine learning model to incorporate the residual features into the adjusted fine polygon mesh. Leveraging of the machine learning model restores additional detail from the polygon mesh because the adjusted fine polygon mesh has more nodes and a higher level of resolution than the fine polygon mesh after the incorporation of the residual features.

In some examples, the fine polygon mesh is displayed in the user interface while the mesh progression system generates the adjusted fine polygon mesh. Further iterations of the series of progressive updates incorporate additional residual features from the polygon mesh into additional adjusted fine polygon meshes.

Progressively generating fine polygon meshes in this manner overcomes the disadvantages of conventional mesh rendering techniques that are limited to generating and transmitting simplified polygon meshes without restoring a level of resolution. For example, generating a fine polygon mesh based on a coarse polygon mesh and progressively updating the fine polygon mesh to include high resolution residual features based on later-received additional information lowers the amount of data used to transmit the polygon mesh over a network at one time. This also results in a detailed and realistic polygon mesh for display in the user interface.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for progressively generating fine polygon meshes described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 8.

The computing device 102 also includes an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 for display in a user interface 110 for output, e.g., by a display device 112. Although illustrated as implemented locally at the computing device 102, functionality of the image processing system 104 is also configurable entirely or partially via functionality available via the network 114, such as part of a web service or "in the cloud."

The computing device 102 also includes a mesh progression module 116 which is illustrated as incorporated by the image processing system 104 to process the digital content 106. In some examples, the mesh progression module 116 is separate from the image processing system 104 such as in an example in which the mesh progression module 116 is available via the network 114.

The mesh progression module 116 is configured to generate a fine polygon mesh 118 and an adjusted fine polygon mesh 120 by first receiving an input 122 that includes a coarse polygon mesh 124. For example, the coarse polygon mesh 124 is a simplified version of an original polygon mesh received by the computing device 102 in a situation when bandwidth availability does not allow the original polygon mesh to be received. The coarse polygon mesh 124 differs from the original polygon mesh by having a lower level of resolution and fewer nodes connecting polygons than the original polygon mesh.

To restore detail of the original polygon mesh, the mesh progression module 116 generates the fine polygon mesh 118 based on the coarse polygon mesh 124. The fine polygon mesh 118 has a higher resolution and more nodes connecting polygons than the coarse polygon mesh 124. The mesh progression module 116 uses a machine learning model trained using a dataset including the original polygon mesh to increase detail of the coarse polygon mesh 124 by subdividing polygons of the coarse polygon mesh 124 to generate a fine polygon mesh 118 that visually resembles the original polygon mesh.

In some examples, the mesh progression module 116 progressively generates the adjusted fine polygon mesh 120 based on the fine polygon mesh 118. For example, the mesh progression module 116 also receives an input 122 including additional information 126. The additional information 126 describes a residual feature of the polygon mesh. Residual features include individual visual features of the original polygon mesh or characteristics of the original polygon mesh. In this example, the original polygon mesh depicts a man, and residual features include a nose, eyes, lips, and ears. After receiving the additional information 126 describing the residual features, the mesh progression module 116 incorporates the residual features into the adjusted fine polygon mesh 120 to increase a level of detail compared to the fine polygon mesh 118. For example, the additional information 126 includes data that specifies vertex coordinates of polygons for the residual feature of the polygon mesh, and the mesh progression module 116 uses the vertex coordinates to re-create the residual features of the original polygon mesh on the fine polygon mesh 118. In some examples, the additional information 126 is received separately from the coarse polygon mesh 124, reducing the amount of information transmitted over the network 114. In additional examples, the mesh progression module 116 progressively generates additional adjusted fine polygon meshes, each iteration having a higher resolution, more nodes, and more visual detail than the last iteration.

The mesh progression module 116 then generates an output including the adjusted fine polygon mesh 120 for display in the user interface 110. This allows the adjusted fine polygon mesh 120 to be presented that visually resembles the original polygon mesh without transmitting the entire original polygon mesh over the network 114.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Progressively Generating Fine Polygon Meshes

Figure 2:
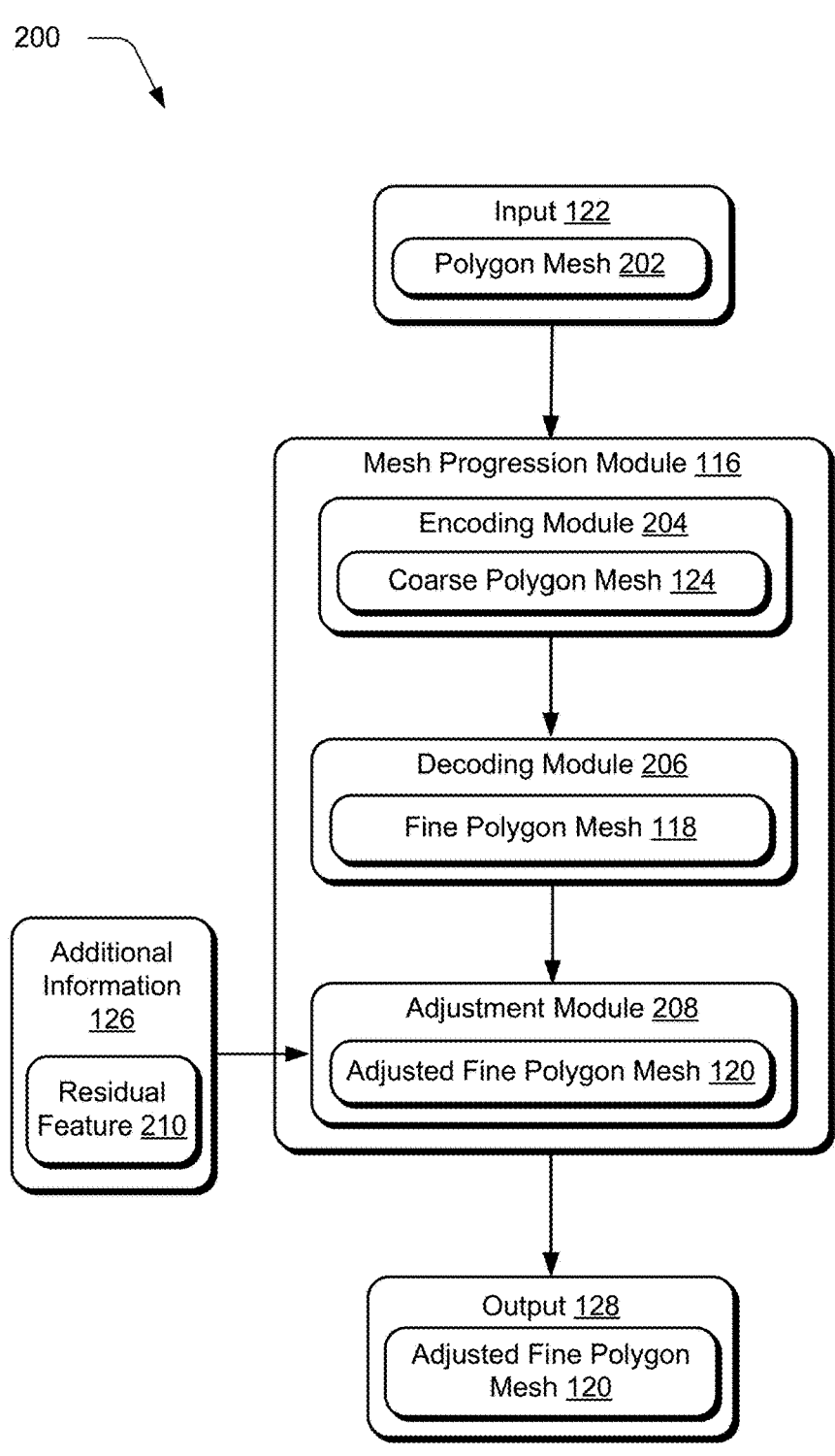
FIG. 2 depicts a system in an example implementation showing operation of a mesh progression module for progressively generating fine polygon meshes.

FIG. 2 depicts a system 200 in an example implementation showing operation of the mesh progression module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-8.

To begin in this example, a mesh progression module 116 receives a polygon mesh 202. For example, the polygon mesh 202 is a digital representation of a 3D object or surface in 3D modeling. The polygon mesh 202 includes a collection of polygon faces, edges, and nodes that define the shape and structure of the object. For example, the polygon mesh 202 includes a collection of different triangles that are connected along the edges of the different triangles to form a 3D virtual object. In some examples, a number of nodes or vertices of the polygon mesh 202 indicates a level of resolution for the polygon mesh 202. For example, a polygon mesh with a larger number of nodes indicates that the polygon mesh has more polygon faces and thus a higher level or resolution than a polygon mesh with a smaller number of nodes.

The mesh progression module 116 also includes an encoding module 204. In this example, the polygon mesh 202 has a level of resolution that is too high to transmit over a network. For this reason, the encoding module 204 generates a coarse polygon mesh 124 that is a compressed representation with fewer nodes than the polygon mesh 202. For example, the encoding module 204 encodes details of the polygon mesh 202 by replacing the polygons of the polygon mesh 202 with fewer polygons to reduce a level of resolution of the polygon mesh 202. The coarse polygon mesh 124 has a level of resolution that is low enough to comply with bandwidth requirements for data transfer over the network. The mesh progression module 116 then transmits the coarse polygon mesh 124 to a client device.

The mesh progression module 116 also includes a decoding module 206. After the client device receives the coarse polygon mesh 124, the decoding module 206 generates a fine polygon mesh 118 that is a decompressed representation with more nodes than the coarse polygon mesh 124. For example, the decoding module 206 decodes details of the coarse polygon mesh 124 by subdividing polygons of the coarse polygon mesh 124 into multiple polygons to increase a level of resolution of the coarse polygon mesh 124. To do this, the decoding module 206 uses a machine learning model trained using a dataset including the polygon mesh 202. The machine learning model is discussed in detail below with respect to FIG. 4.

The mesh progression module 116 also includes an adjustment module 208. The adjustment module 208 generates an adjusted fine polygon mesh 120 that has more nodes than the fine polygon mesh 118. To do this, the adjustment module 208 receives additional information 126 specifying a residual feature 210, which represents a specific detailed visual feature of the polygon mesh 202. The additional information 126 specifies vertex coordinates of polygons for the residual feature 210 of the polygon mesh 202. In some examples, the additional information 126 specifies a higher level of detail than the coarse polygon mesh 124 but is received separately from the coarse polygon mesh 124 to reduce data transmission in compliance with bandwidth requirements for data transfer over the network. The adjustment module 208 uses the machine learning model to supplement the fine polygon mesh 118 with the additional information 126 including the residual feature 210 to generate the adjusted fine polygon mesh 120. In some examples, the adjusted fine polygon mesh 120 is progressively updated using additional residual features. The mesh progression module 116 then generates an output 128 including the adjusted fine polygon mesh 120 for display in the user interface. This allows an adjusted fine polygon mesh 120 to be generated and rendered in the user interface 110 using limited transmitted data by receiving a coarse polygon mesh 124 and later receiving additional information 126.

Figure 3:
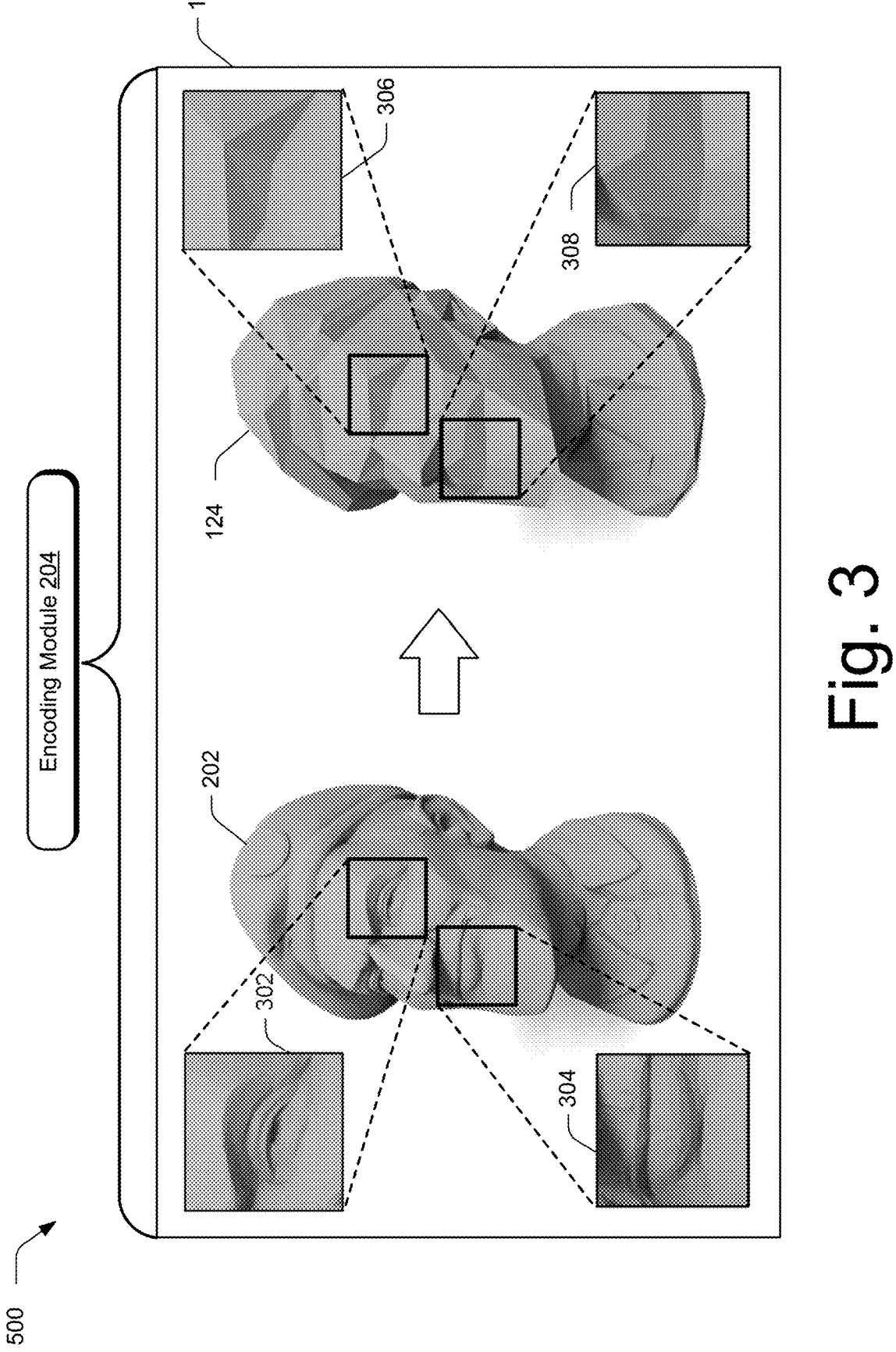
FIG. 3 depicts an example of generating a coarse polygon mesh by encoding a polygon mesh.
Figure 4:
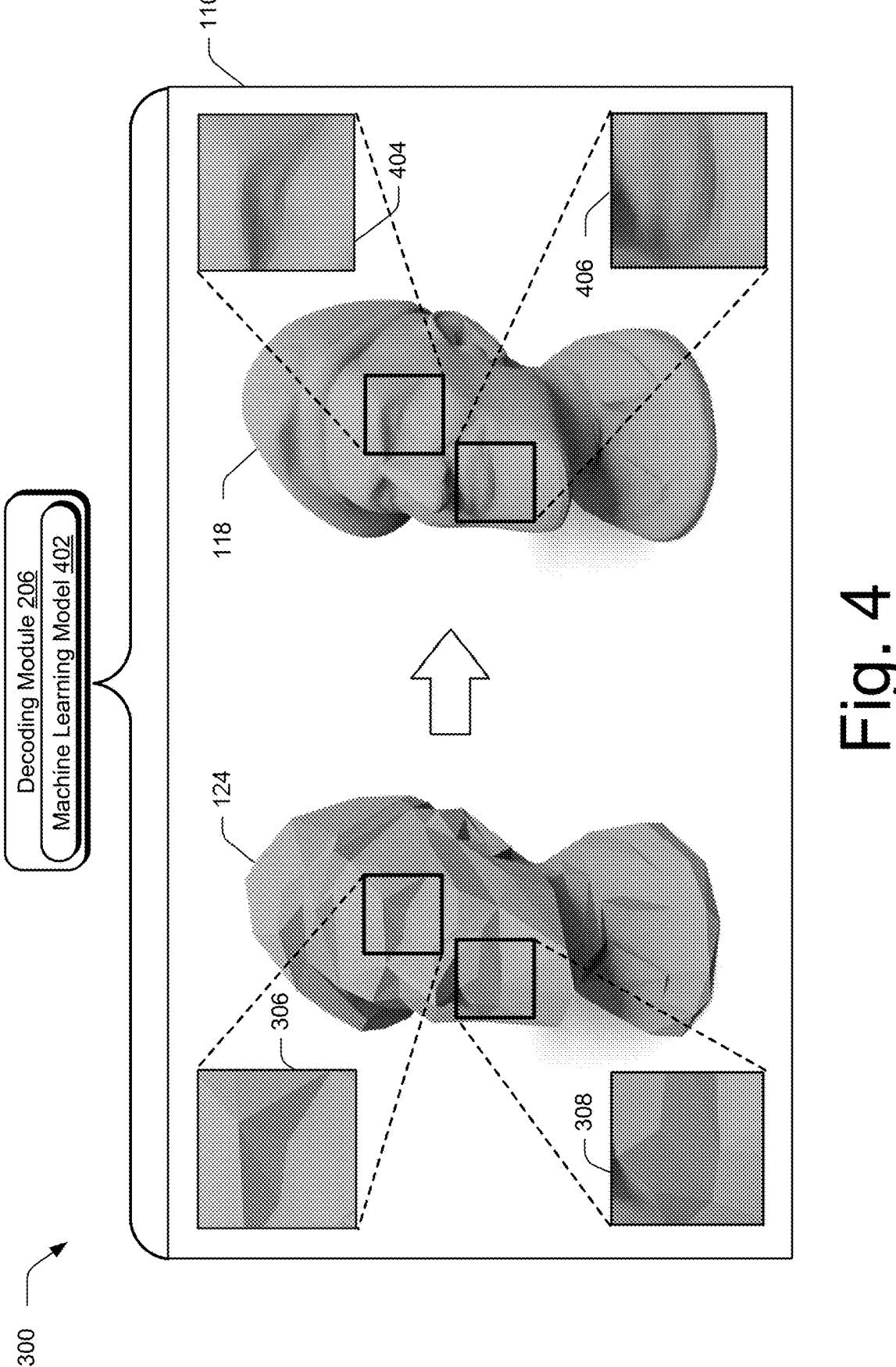
FIG. 4 depicts an example of generating a fine polygon mesh by decoding the coarse polygon mesh.
Figure 5:
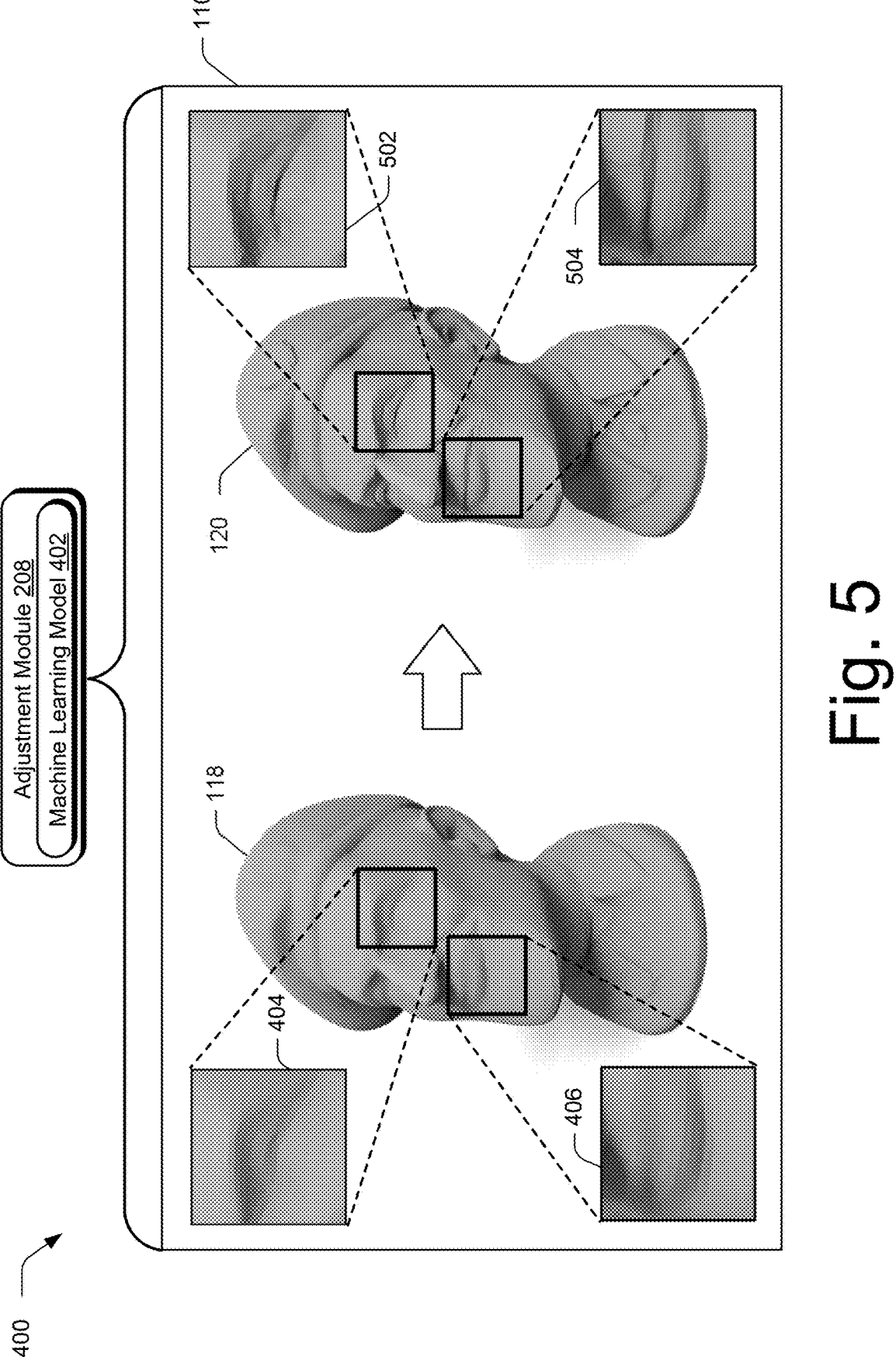
FIG. 5 depicts an example of generating an adjusted fine polygon mesh based on the fine polygon mesh.

FIGS. 3-5 depict stages of progressively generating fine polygon meshes. In some examples, the stages depicted in these figures are performed in a different order than described below.

FIG. 3 depicts an example 300 of generating a coarse polygon mesh 124 by encoding a polygon mesh 202. As illustrated, the mesh progression module 116 receives a user input including the polygon mesh 202. The polygon mesh 202 is a digital representation of a 3D object or surface in 3D modeling. The polygon mesh 202 is formed by polygon faces, edges, and nodes that define the shape and structure of the 3D object. For example, the polygon mesh 202 includes a collection of different triangles that are connected along the edges of the different triangles to form a 3D virtual object. In some examples, a number of nodes or vertices of the polygon mesh 202 indicates a level of resolution for the polygon mesh 202. For example, a polygon mesh with a larger number of nodes indicates that the polygon mesh has more polygon faces and thus a higher level or resolution than a polygon mesh with a smaller number of nodes.

In this example, the polygon mesh 202 is a virtual 3D rendering of a man's head displayed in the user interface 110. The polygon mesh 202 is a virtual shell of a head formed by connected triangles. The polygon mesh 202 includes residual features, which are individual visual features of the polygon mesh 202 or characteristics of the polygon mesh 202. In this example, the polygon mesh 202 includes an eye residual feature 302 and a mouth residual feature 304.

The polygon mesh 202 is intended for transmission to a client device for display in a user interface 110 associated with the client device. However, the polygon mesh 202 has a high level of resolution that includes a large amount of data to be transferred to the client device to render the polygon mesh 202. For this reason, the encoding module 204 generates a coarse polygon mesh 124 by encoding the polygon mesh 202. The coarse polygon mesh 124 is a simplified representation of the polygon mesh 202 with fewer nodes than the polygon mesh 202. For example, the encoding module 204 encodes details of the polygon mesh 202 by replacing the polygons of the polygon mesh 202 with fewer polygons to reduce a level of resolution of the polygon mesh 202. The encoding module 204 uses a machine learning model that leverages the polygon mesh 202 by learning filters that map features and vertex coordinates from a higher-resolution level to a lower-resolution level. Because the coarse polygon mesh 124 includes fewer polygons than the polygon mesh 202, the coarse polygon mesh 124 also includes fewer nodes than the polygon mesh 202.

The machine learning model is trained using a dataset including a plurality of different coarse polygon meshes and corresponding fine polygon meshes. This allows the machine learning model to learn patterns and structures for various detailed features of polygon meshes, as described in further detail with respect to FIG. 4. For example, the machine learning model is trained using a dataset including three-dimensional facial features represented as coarse polygon meshes and fine polygon meshes to learn compression and decompression of the facial features. In some examples, the machine learning model is trained during encoding based on the polygon mesh used to generate the coarse polygon mesh.

Before generating the coarse polygon mesh 124, the encoding module 204 preprocesses the polygon mesh 202, which is represented by M=(V,F) with vertex positions V and faces F into a data stream $d_{0 \ldots t}$ for progressive transmission to the client device. To obtain an initial level of detail (LoD) $M^0 \ldots M^L$ representation, where $M^i=(V^i,F^i)$ and $M^0$ is a coarse mesh with a fixed number of faces, the encoding module 204 decimates the input mesh M via QSlim, which is an algorithm used for simplifying and reducing the complexity of polygon meshes, to obtain a coarse mesh $M^0$ with $|F^0|=400$ faces. The number of faces for simplification is picked to yield sufficiently coarse meshes to facilitate compression while retaining topological details of the polygon mesh 202 for subdivision.

The encoder E of the encoding module 204 operates on the sequence of LoD meshes: $M^L$, $M^{L-1}$ . . . $M^0$, where triangles in a high-resolution mesh are grouped into groups of four and are mapped to a single triangle on the next level of resolution based on the LoD. The encoding module 204 defines convolution and pooling operators based on this mapping following SubdivNet, as described in Hu, Shi-Min, et al. "Subdivision-based mesh convolution networks." *ACM Transactions on Graphics (TOG)* 41.3 (2022). Input per-face features at a highest level in the encoder are 13-dimensional (i.e., $f^L_{mesh} \in R^{13}$), including a 7-dimensional shape feature (face area, three interior angles, and the inner product between the face normal and the vertex normals) and a 6-dimensional pose feature (face center coordinate and face normal). Unlike SubdivNet, where the input per-face features at the subsequent levels are the output per-face features from the previous level, the input per-face features of the encoding module 204 at the subsequent levels are a concatenation of the output per-face features from the previous level (i.e., $f^i$) and the 13-dimensional preface features are computed based on mesh M (i.e., $f^i_{mesh}$). This allows the encoding module 204 to encode the local geometric details of each LoD mesh into the feature encoding process. The encoding module 204 maps the input preface features at level i to learned per-face features at the subsequent level (i.e., level i–1): $f^{i-1} \in R^8$, $\forall$ 1≤i≤L.

In this example, the coarse polygon mesh 124 includes a coarse eye 306 depicted using three triangles instead of hundreds of triangles that form the eye residual feature 302 of the polygon mesh 202. The coarse polygon mesh 124 also includes a coarse mouth 308 depicted using five triangles instead of hundreds of triangles that form the mouth residual feature of the polygon mesh 202.

The mesh progression module 116 then transmits the coarse polygon mesh 124 to the client device. Because the coarse polygon mesh 124 has a lower resolution than the polygon mesh 202 and includes fewer nodes than the polygon mesh 202, the coarse polygon mesh 124 is transmitted using less data than a transmission of the polygon mesh 202.

FIG. 4 depicts an example 400 of generating a fine polygon mesh 118 by decoding the coarse polygon mesh 124. FIG. 4 is a continuation of the example described in FIG. 3. After the client device receives the coarse polygon mesh 124, the decoding module 206 decodes the coarse polygon mesh 124.

For example, the coarse polygon mesh 124 has a low level of resolution compared to the polygon mesh 202 and does not exhibit a desired visual effect when displayed in the user interface 110. To increase the level of resolution of the coarse polygon mesh 124, the decoding module 206 generates a fine polygon mesh 118 by decoding the coarse polygon mesh 124 using a machine learning model 402. The machine learning model 402 is trained using a dataset including the polygon mesh 202 used to generate the coarse polygon mesh 124. For example, because geometric details are encoded by the encoding module 204 as per-face features at each level i: $f^i$, the machine learning model 402 uses the per-face features to reconstruct the polygon mesh 202 at high level of detail.

The machine learning model 402 subdivides polygons of the coarse polygon mesh 124 into multiple polygons to generate the fine polygon mesh 118 having a higher level of resolution than the coarse polygon mesh 124. For example, the fine polygon mesh 118 has more polygons and more nodes connecting polygons than the coarse polygon mesh 124, resulting in a higher level of resolution compared to the coarse polygon mesh 124. Because the machine learning model 402 is trained using the dataset including different coarse polygon meshes and corresponding fine polygon meshes to learn patterns and structures for various detailed features of polygon meshes, the machine learning model reconstructs features of the polygon mesh 202 in fine polygon mesh 118. For example, the machine learning model 402 is trained using a dataset including 3D facial features represented as polygons and learns to reconstruct facial features based on representations of facial features in corresponding coarse polygon meshes and fine polygon meshes.

To subdivide the polygons of the coarse polygon mesh 124, the decoding module 206 first splits each edge of a polygon at a midpoint of the polygon. In this example, each triangle is subdivided into four triangles. This provides the triangulations $F^1 \ldots F^L$, where $|F^i|=4|F^{i-1}|$. To obtain vertex coordinates at the subdivision levels, the decoding module 206 uses successive self-parameterization, which allows the decoding module 206 to map each point on each mesh $M^i$ to its original mesh M, using the coordinates from the mapping for the vertices: $V^1 \ldots V^L$. In this example, the decoding module 206 sets L=3, which is selected to provide enough triangle budget to reconstruct shapes in the dataset. In some examples, the fine polygon mesh 118 is a remeshing of the polygon mesh 202 because the fine polygon mesh 118 has a similar geometry but a different triangulation compared to the polygon mesh 202. In some examples, remeshing is used to optimize a size of the polygon mesh 202.

The machine learning model 402 operates on the coarse polygon mesh 124 and leverages learned per-face features $f^i$. As described above, the machine learning model 402 of the encoding module 204 computes the 13-dimensional shape and poses features of the coarse mesh $M^0$ to derive the per-face features $f^0_{mesh}$. The machine learning model 402 then concatenates features $f^0$ mesh with learned per-face features $f^0$. The concatenated features are input to the machine learning model 402 of the decoding module 206. A Neural Subdivision architecture is adapted to develop a subdivision-based decoder that uses the features of two adjacent triangles to predict vertex positions at the next level of subdivision $\tilde{V}^i$, i=1 . . . L. For example, the Neural Subdivision architecture learns subdivision rules and patterns directly from data to automate or enhance subdivision by training neural networks to generate subdivided versions of input polygon meshes. The decoding module 206 then maps the input per-face features at level i, and in some examples the learned per-face features are transmitted from the same level in the encoder to per-face features at the next subdivision level in the encoder (i.e., level i+1): $f^{i+1} \in \mathbb{R}^8$, $\forall$ $0 \le i \le L-1$. In some examples, corresponding faces at the same level of detail are connected with skip connections to speed up training and improve learned feature quality.

The machine learning model 402 is trained end-to-end using reconstruction losses and sparsity losses. The reconstruction loss favors a higher quality of reconstruction and the sparsity loss favors sparser features and compression of a signal. The reconstruction loss includes two terms. First, the $l_2$ distance between vertex positions is predicted by the decoder and true LoD positions using the following equation:

$$L_{corr} = \sum_{i=1}^{L} \frac{1}{|V^i|} \left\| \tilde{V}^i - V^i \right\|_2$$

where the second term is a loss in a gradient domain, measuring a similarity of Jacobians, which matches differential properties of true and predicted LoD surfaces, including normals and curvature using the following equation:

$$L_{jacobian} = \sum_{i=1}^{L} \frac{1}{|F^i|} \sum_{j=1}^{|F^i|} \left\| J^i_j - V^i \right\|_2$$

where $J^i_j$ is the Jacobian of the deformation that maps the $j^{th}$ triangle of the true LoD mesh $M^i$ to its predicted counterpart $\widetilde{M}_t$ and I is the identity matrix.

A sparsity loss is induced to avoid transmitting features that encode redundant information in regions whose geometry is inferred by the decoder without any aid using the following equation:

$$L_{sparsity} = \sum_{i=0}^{L-1} \frac{1}{|F^i|} \left\| f^i \right\|_1$$

After network training, the machine learning model 402 sorts the features based on magnitude and transmits the features progressively from the encoding module 204 to the decoding module 206. Total training loss for the machine learning model 402 is defined as a sum of weighted terms with α=1 and β=0.1 using the following equation:

$$L = L_{corr} + \alpha L_{jacobian} + \beta L_{sparsity}$$

In this example, the fine polygon mesh 118 includes a fine resolution eye 404 depicted using dozens of triangles instead of the three triangles forming the coarse eye 306 of the coarse polygon mesh 124. The fine polygon mesh 118 also includes a fine resolution mouth 406 depicted using dozens of triangles instead of the five triangles forming the coarse mouth 308 of the coarse polygon mesh 124. After decoding the coarse polygon mesh 124, the fine polygon mesh 118 has a higher level of resolution than the coarse polygon mesh 124 and visually resembles the polygon mesh 202 more than the coarse polygon mesh 124 resembles the polygon mesh 202. In some examples, the fine polygon mesh 118 is output for display in the user interface 110 before the adjusted fine polygon mesh 120 is generated, described below with respect to FIG. 5.

FIG. 5 depicts an example 500 of generating an adjusted fine polygon mesh 120 based on the fine polygon mesh 118. FIG. 5 is a continuation of the example described in FIG. 4. After the decoding module 206 generates the fine polygon mesh 118 by decoding the coarse polygon mesh 124, the adjustment module 208 generates the adjusted fine polygon mesh 120 by progressively adjusting the fine polygon mesh 118.

To begin, the adjustment module 208 receives additional information 126 specifying a residual feature 210, which represents a specific detailed visual feature of the polygon mesh 202. The additional information 126 is received separately from the coarse polygon mesh 124. In this example, the polygon mesh 202 depicts a man, and residual features include a nose, eyes, lips, and ears. The additional information 126 specifies dimensions of a facial feature represented in the polygon mesh 202 and specifies vertex coordinates of polygons for the residual feature 210 of the polygon mesh 202. In some examples, the additional information 126 specifies a color or a texture of a portion of the polygon mesh 202. For example, the additional information 126 specifies a higher level of detail than the coarse polygon mesh 124 but is received separately from the coarse polygon mesh 124 to reduce data transmission in compliance with bandwidth requirements for data transfer over the network.

The adjustment module 208 uses the machine learning model 402 to supplement the fine polygon mesh 118 with the additional information 126 including the residual feature 210 to generate the adjusted fine polygon mesh 120. For example, the machine learning model 402 of the adjustment module 208 replaces a portion of the fine polygon mesh 118 with the residual feature 210 of the polygon mesh 202. The adjustment module 208 locates the vertex coordinates specified for the polygons of the residual feature 210 in the additional information 126 to incorporate the residual feature 210 into the adjusted fine polygon mesh 120. The adjustment module 208 also uses the additional information 126 specifying dimensions of the residual feature 210 of the polygon mesh 202 to incorporate the residual feature 210 into the adjusted fine polygon mesh 120 at a specified size.

In some examples, the adjusted fine polygon mesh 120 is progressively updated using additional residual features. Each iteration of progressive updates has a higher resolution, more nodes, and more visual detail than the last iteration. For example, the fine polygon mesh 118 is displayed in the user interface 110 while the adjusted fine polygon mesh 120 is generated.

In this example, the adjustment module 208 incorporates the eye residual feature 302 into the adjusted fine polygon mesh 120 by replacing the fine resolution eye 404 from the fine polygon mesh 118 with the eye residual feature 302 and blending polygons of the eye residual feature 302 into the adjusted fine polygon mesh 120 to generate an adjusted fine resolution eye 502. The adjustment module 208 also incorporates the mouth residual feature 304 into the adjusted fine polygon mesh 120 by replacing the fine resolution mouth 406 from the fine polygon mesh 118 with the mouth residual feature 304 and blending polygons of the mouth residual feature 304 into the adjusted fine polygon mesh 120 to generate an adjusted fine resolution mouth 504. After incorporation of residual features, the adjusted fine polygon mesh 120 has a higher level of resolution than the fine polygon mesh 118 and visually resembles the polygon mesh 202 more than the fine polygon mesh 118 resembles the polygon mesh 202.

The mesh progression module 116 then generates an output 128 including the adjusted fine polygon mesh 120 for display in the user interface. This allows an adjusted fine polygon mesh 120 to be generated and rendered in the user interface 110 using limited transmitted data by receiving a coarse polygon mesh 124 and separately receiving additional information 126.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-5.

FIG. 6 depicts a procedure 600 in an example implementation of progressively generating fine polygon meshes. At block 602, a coarse polygon mesh 124 is received.

At block 604, a fine polygon mesh 118 is generated that has a higher level of resolution than the coarse polygon mesh 124 by decoding the coarse polygon mesh 124 using a machine learning model 402. In some examples, generating the fine polygon mesh 118 includes subdividing polygons of the coarse polygon mesh 124 into multiple polygons. Additionally or alternatively, the machine learning model 402 is trained using a dataset including three-dimensional facial features represented as polygons. In some examples, the machine learning model 402 is trained using a dataset including the polygon mesh 202 used to generate the coarse polygon mesh 124.

At block 606, additional data is received describing a residual feature 210 of a polygon mesh 202. In some examples, the additional data specifies vertex coordinates of polygons for the residual feature 210 of the polygon mesh. Additionally or alternatively, the additional data specifies dimensions of a facial feature represented in the polygon mesh 202. In some examples, the additional data specifies a color or a texture of a portion of the polygon mesh 202.

At block 608, an adjusted fine polygon mesh 120 is generated that has a higher level of resolution than the fine polygon mesh 118 based on the additional data. In some examples, generating the adjusted fine polygon mesh 120 includes replacing a portion of the fine polygon mesh 118 with the residual feature 210 of the polygon mesh 202. In some examples, the fine polygon mesh 118 is displayed in a user interface 110 while the adjusted fine polygon mesh 120 is generated.

FIG. 7 depicts a procedure 700 in an additional example implementation of progressively generating fine polygon meshes. At block 702, a polygon mesh 202 is received.

At block 704, a coarse polygon mesh 124 is generated that has fewer nodes than the polygon mesh 202 by encoding details of the polygon mesh 202.

At block 706, the coarse polygon mesh 124 is transmitted to a client device, the coarse polygon mesh 124 configured to cause the client device to generate a fine polygon mesh 118 that has more nodes than the coarse polygon mesh 124 by decoding the coarse polygon mesh 124 using a machine learning model 402. In some examples, additional data is received that specifies vertex coordinates of polygons for a residual feature 210 of the polygon mesh 202. Additionally or alternatively, an adjusted fine polygon mesh 120 is generated that has more nodes than the fine polygon mesh 118 based on the additional data. For example, generating the adjusted fine polygon mesh 120 includes replacing a portion of the fine polygon mesh 118 with the residual feature 210 of the polygon mesh 202. In some examples, the additional data specifies dimensions of a facial feature represented in the polygon mesh 202. Additionally or alternatively, the fine polygon mesh 118 is displayed in a user interface 110 while the adjusted fine polygon mesh 120 is generated. In some examples, the machine learning model 402 is trained using a dataset including the polygon mesh 202.

Example System and Device

Figure 8:
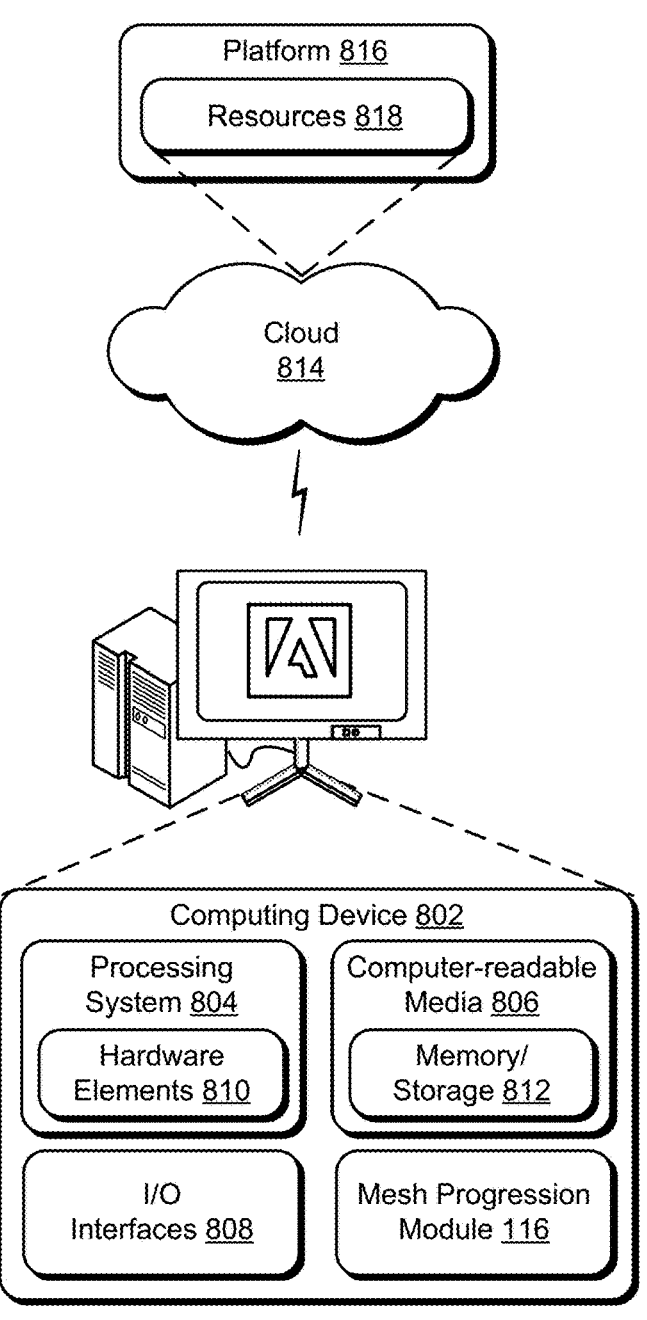
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that implement the various techniques described herein. This is illustrated through inclusion of the mesh progression module 116. The computing device 802 is configurable, for example, as a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 806 is illustrated as including memory/storage 812. The memory/storage 812 represents memory/storage capacity associated with one or more computer-readable media. The memory/storage 812 includes volatile media (such as random access memory (RAM)) and/or nonvolatile media (such as read only memory (ROM), Flash memory, optical disks, magnetic disks, and so forth). The memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices and/or processing systems 804) to implement techniques, modules, and examples described herein.

The techniques described herein are supported by various configurations of the computing device 802 and are not limited to the specific examples of the techniques described herein. This functionality is also implementable through use of a distributed system, such as over a "cloud" 1114 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that can be utilized when computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

What is claimed is:

1. A method comprising:
receiving, by a processing device, a coarse polygon mesh;
   generating, by the processing device, a fine polygon mesh that has a higher level of resolution than the coarse polygon mesh by decoding the coarse polygon mesh using a machine learning model;
receiving, by the processing device, additional data specifying a shape of a three-dimensional feature corresponding to a portion of the fine polygon mesh, one or more dimensions for the three-dimensional feature, and vertex coordinates for positioning the three-dimensional feature at a location in the fine polygon mesh; and
   generating, by the processing device, an adjusted fine polygon mesh that has a higher level of resolution than the fine polygon mesh by incorporating the three-dimensional feature at the location of the fine polygon mesh, the three-dimensional feature having a size corresponding to the one or more dimensions.

2. The method of claim 1, further comprising incorporating the three-dimensional feature into the portion of the fine polygon mesh by using the machine learning model to change polygons of the three-dimensional feature based on the vertex coordinates.

3. The method of claim 2, wherein generating the adjusted fine polygon mesh includes replacing the portion of the fine polygon mesh with a residual feature defined by the vertex coordinates.

4. The method of claim 1, wherein the additional data specifies a color or a texture of the portion of the fine polygon mesh.

5. The method of claim 1, wherein the fine polygon mesh is displayed in a user interface while the adjusted fine polygon mesh is generated.

6. The method of claim 1, wherein generating the fine polygon mesh includes subdividing polygons of the coarse polygon mesh into multiple polygons.

7. The method of claim 1, wherein the machine learning model is trained using a dataset including three-dimensional facial features represented as polygons.

8. The method of claim 1, wherein the machine learning model is trained using a dataset including a different polygon mesh used to generate the coarse polygon mesh.

9. The method of claim 1, wherein the coarse polygon mesh is transmitted separately from the additional data, and a level of resolution of the coarse polygon mesh is based on an amount of bandwidth.

10. The method of claim 1, wherein the additional data specifies a pose of the three-dimensional feature.

11. The method of claim 1, further comprising progressively updating the adjusted fine polygon mesh by incorporating one or more additional three-dimensional features into the adjusted fine polygon mesh.

12. The method of claim 1, further comprising blending the three-dimensional feature into the adjusted fine polygon mesh using the machine learning model.

13. A system comprising:
   a memory component; and
   a processing device coupled to the memory component, the processing device to perform operations comprising:
      receiving a polygon mesh;
      generating a coarse polygon mesh that has fewer nodes than the polygon mesh by encoding details of the polygon mesh;
      transmitting the coarse polygon mesh to a client device, the coarse polygon mesh configured to cause the client device to generate a fine polygon mesh that has more nodes than the coarse polygon mesh by decoding the coarse polygon mesh using a machine learning model;
      transmitting additional data specifying a shape of a three-dimensional feature corresponding to a portion of the fine polygon mesh, one or more dimensions for the three-dimensional feature, and vertex coordinates for positioning the three-dimensional feature at a location in the fine polygon mesh; and
      causing generation of an adjusted fine polygon mesh that has a higher level of resolution than the fine polygon mesh by incorporating the three-dimensional feature at the location of the fine polygon mesh, the three-dimensional feature having a size corresponding to the one or more dimensions.

14. The system of claim 13, wherein generating the adjusted fine polygon mesh includes replacing the portion of the fine polygon mesh with a residual feature of the polygon mesh indicated by the vertex coordinates.

15. The system of claim 13, wherein the fine polygon mesh is displayed in a user interface while the adjusted fine polygon mesh is generated.

16. The system of claim 13, wherein the machine learning model is trained using a dataset including the polygon mesh.

17. A non-transitory computer-readable storage medium storing executable instructions, which when executed by a processing device, cause the processing device to perform operations comprising:

receiving a coarse polygon mesh;

generating a fine polygon mesh that has more nodes than the coarse polygon mesh by decoding the coarse polygon mesh using a machine learning model;

receiving additional data specifying a shape of a three-dimensional feature corresponding to a portion of the fine polygon mesh, one or more dimensions for the three-dimensional feature, and vertex coordinates for positioning the three-dimensional feature at a location in the fine polygon mesh; and generating an adjusted fine polygon mesh that has more nodes than the fine polygon mesh by incorporating the three-dimensional feature at the location of the fine polygon mesh, the three-dimensional feature having a size corresponding to the one or more dimensions.

18. The non-transitory computer-readable storage medium of claim 17, wherein the vertex coordinates relate to a residual feature of the fine polygon mesh and generating the adjusted fine polygon mesh includes replacing the portion of the fine polygon mesh with the residual feature of the fine polygon mesh.

19. The non-transitory computer-readable storage medium of claim 17, wherein the fine polygon mesh is displayed in a user interface while the adjusted fine polygon mesh is generated.

20. The non-transitory computer-readable storage medium of claim 17, wherein the machine learning model is trained using a dataset including three-dimensional facial features represented as polygons.

* * * * *